UNITED STATES PATENT OFFICE.

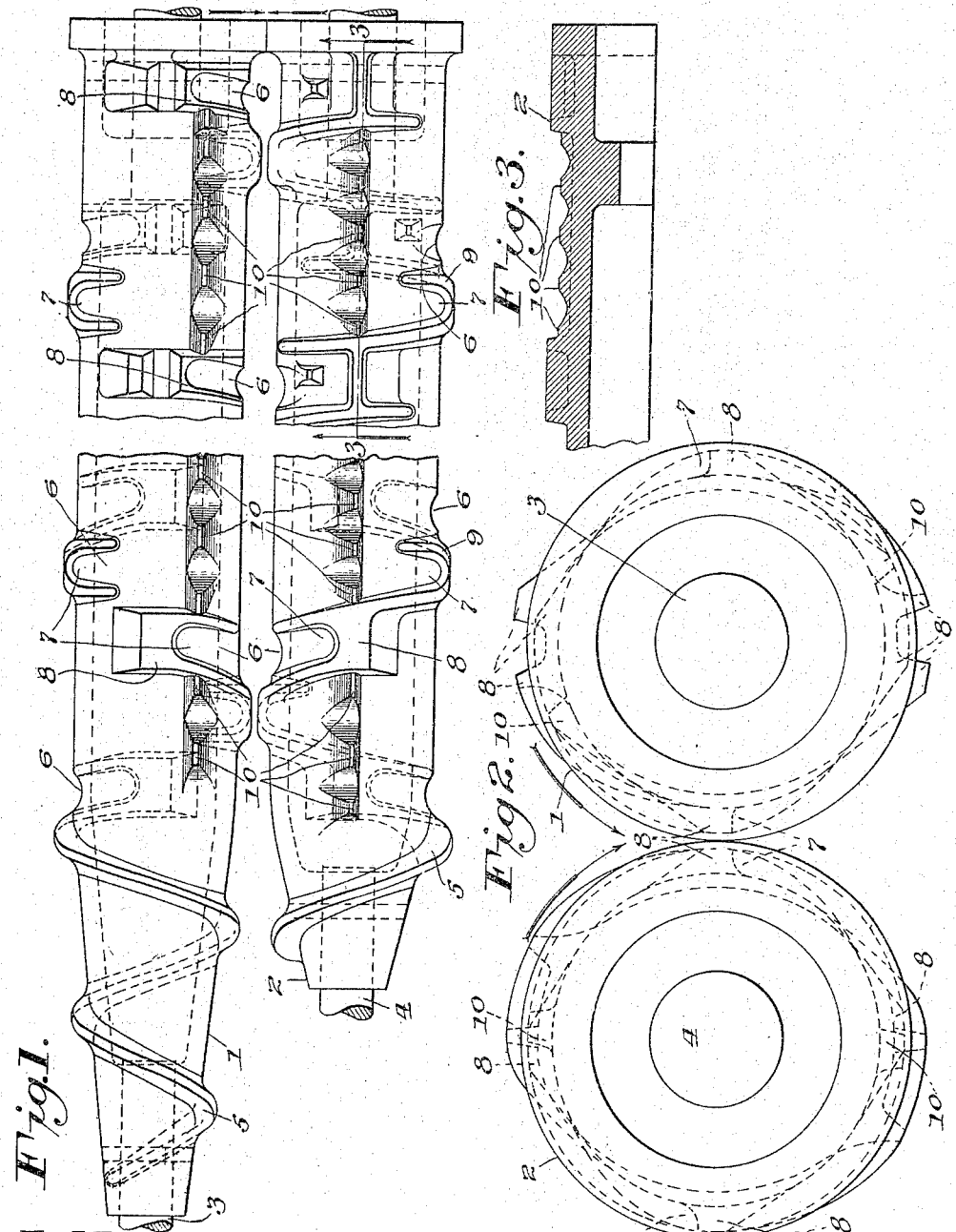
J. A. STONE.
SNAPPING ROLLS FOR CORN HARVESTERS, HUSKERS, OR THE LIKE.
APPLICATION FILED MAR. 9, 1914.
1,226,719.    Patented May 22, 1917.

JOHN A. STONE, OF CHICAGO, ILLINOIS, ASSIGNOR TO INTERNATIONAL HARVESTER COMPANY OF NEW JERSEY, A CORPORATION OF NEW JERSEY.

SNAPPING-ROLLS FOR CORN HARVESTERS, HUSKERS, OR THE LIKE.

1,226,719.  Specification of Letters Patent.  Patented May 22, 1917.

Application filed March 9, 1914. Serial No. 823,621.

*To all whom it may concern:*

Be it known that I, JOHN A. STONE, a citizen of the United States, residing at Chicago, in the county of Cook and State of Illinois, have invented certain new and useful Improvements in Snapping-Rolls for Corn Harvesters, Huskers, or the like, of which the following is a full, clear, and exact specification.

My invention relates to snapping rolls for corn harvesters, huskers or the like, designed to sever the ears of corn from the stalk, and consists in a novel construction of rolls and stalk advancing means whereby a high degree of efficiency in the operation of the machine is attained; the object of the invention being to provide a mechanism that will sever the ears from the stalk in a positive manner and prevent slipping of the corn when between the rolls. These objects are attained by means of mechanism, one embodiment of which is illustrated in the accompanying drawing, in which—

Figure 1 is a top plan view of part of a pair of opposing coacting snapping rolls having my invention embodied in their construction.

Fig. 2 is an end elevation of Fig. 1.

Fig. 3 is a detail sectional view of one of the rolls taken on line 3—3 of Fig. 1.

Referring to the drawings, wherein the same reference characters designate like parts throughout the several views, 1 and 2 represent right and left hand rolls secured to shafts 3 and 4, respectively, and rotatable in opposite directions by suitable means and in suitable bearings, not shown. These rolls are tapered at their receiving ends for the purpose of facilitating the entrance of stalks between them, the tapered portions of the rolls being provided with oppositely disposed spirally arranged ribs 5 operative to move the stalks rearward between them. The bodies of the rolls are cylindrical in form and provided with a series of opposing spirally arranged eccentric channels 6, spaced apart and leading rearward around the rolls in a direction opposite to that in which they rotate, the channels terminating in pockets 7 that are bridged across by opposing concentric ear engaging members 8 that are inclined toward the body of the roll in a direction opposite that of its rotation with the rear walls of the channels raised above the body of the roll and terminating in reversely turned ends 9 forming opposing ear engaging members. 10 represents corrugated or toothed rib members disposed longitudinally upon the rolls in alinement with each other and parallel with the axes of the rolls, connected with the outside of the raised walls of the channels 6 and spanning the intervening space between the same ends of alternate channels from end to end of the cylindrical bodies of the rolls, the rib members upon the roll 1 being arranged to pass in front of those upon the roll 2 as the coacting rolls are rotated in opposite directions, and each set of rib members acting to prevent any slipping between the rolls and the corn.

Having shown and described a preferred form of my invention, I do not wish to have it confined closely to the details of construction as illustrated, it being understood that changes may be made in the detailed parts of the structure without departing from the spirit of my invention.

What I claim as my invention and desire to secure by Letters Patent is:

1. A snapping roll having a plurality of longitudinally spaced spirally disposed channels in its periphery, and longitudinally extending corrugated corn engaging members intermediate certain of the same.

2. A snapping roll having a plurality of oppositely extending spirally disposed channels in its periphery having their opposite ends in juxtaposition, and longitudinally extending corn engaging toothed rib members extending between the same ends of alternate channels.

3. In a machine of the character described, opposing coacting snapping rolls rotatable in opposite directions, said rolls having cylindrical bodies and oppositely disposed spirally arranged channels therein leading rearward opposite the direction of rotation thereof, having their rear ends raised above the body of the roll, and longitudinally disposed corrugated rib members spanning the intervening spaces between certain of said channels.

4. In a machine of the character described, opposing coacting snapping rolls rotatable in opposite directions, said rolls having cylindrical bodies and oppositely disposed spirally arranged channels therein leading rearward opposite the direction of rotation thereof having their rear ends raised above the body of the rolls, and longitudinal corrugated ribs disposed parallel with the axes of the rolls and spanning the intervening spaces between certain of said channels.

5. In a machine of the character described, opposing coacting snapping rolls rotatable in opposite directions, said rolls having cylindrical bodies and oppositely disposed spirally arranged channels therein leading rearward opposite the direction of rotation thereof having their rear ends raised above the body of the roll, and longitudinally alined corrugated ribs disposed parallel with the axes of the rolls and spanning the intervening spaces between certain of said channels.

6. In a machine of the character described, opposing coacting snapping rolls rotatable in opposite directions, said rolls having cylindrical bodies and oppositely disposed spirally arranged channels therein leading rearward opposite the direction of rotation thereof having their rear ends raised above the body of the roll, and longitudinally alined corrugated ribs disposed parallel with the axes of the rolls and spanning the intervening spaces between certain of said rolls, the ribs upon one roll passing in front of those upon the coacting roll in the direction of their rotation.

7. A snapping roll having spaced channels therein, and a toothed rib connecting said channels.

8. A snapping roll having spirally arranged channels therein, and a longitudinally extending toothed rib connecting said channels.

In testimony whereof I affix my signature, in the presence of two witnesses.

JOHN A. STONE.

Witnesses:
ALBERT W. TEUFEL,
CHAS. H. BURNS.

Copies of this patent may be obtained for five cents each, by addressing the "Commissioner of Patents Washington, D. C."